United States Patent
Sauer et al.

(10) Patent No.: US 6,674,079 B2
(45) Date of Patent: Jan. 6, 2004

(54) METHOD AND APPARATUS FOR MONITORING THE INTERIOR SPACE OF A MOTOR VEHICLE

(75) Inventors: Sivart Sauer, Munich (DE); Carsten Koch, Munich (DE); Su-Birm Park, Aldenoven (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 93 days.

(21) Appl. No.: 10/015,945

(22) Filed: Dec. 17, 2001

(65) Prior Publication Data
US 2002/0113209 A1 Aug. 22, 2002

(30) Foreign Application Priority Data

Dec. 16, 2000 (DE) .......................................... 100 62 977

(51) Int. Cl.[7] ............................................. G08B 13/196
(52) U.S. Cl. ........................................................ 250/330
(58) Field of Search .............................. 250/330, 341.8

(56) References Cited

U.S. PATENT DOCUMENTS

| | | | |
|---|---|---|---|
| 5,361,094 A | | 11/1994 | Jang |
| 5,500,904 A | * | 3/1996 | Markandey et al. ........ 382/103 |
| 5,710,671 A | | 1/1998 | Bichlmaier |
| 5,909,244 A | * | 6/1999 | Waxman et al. ......... 348/222.1 |
| 6,021,210 A | | 2/2000 | Camus et al. |
| 6,028,672 A | * | 2/2000 | Geng ..................... 250/237 G |

FOREIGN PATENT DOCUMENTS

| | | |
|---|---|---|
| DE | 42 28 629 | 3/1994 |
| DE | 44 17 710 | 9/1995 |
| DE | 195 32 680 | 3/1997 |
| DE | 296 17 749 | 3/1997 |
| DE | 197 36 584 | 2/1999 |
| DE | 199 21 488 | 11/2000 |
| EP | 0 680 205 | 11/1995 |

OTHER PUBLICATIONS

Copy of German Search Report dated Mar. 13, 2002 with English blank.
Copy of EPO Search Report dated Mar. 7, 2002 with English blank.

* cited by examiner

Primary Examiner—Christopher W. Fulton
(74) Attorney, Agent, or Firm—Crowell & Moring LLP

(57) ABSTRACT

A method and apparatus for monitoring the interior space of a motor vehicle by means of IR radiation include at least one stationary IR transmitter and at least one stationary IR receiver arranged in a central position in the vehicle interior space. The interior space is at least temporarily irradiated. The reflected IR radiation is received by an IR camera as IR receiver. For suppression of interfering effects two images of the same object are recorded at different illumination levels. The two images are subtracted from one another with respect to their gray scale values.

11 Claims, 1 Drawing Sheet

METHOD AND APPARATUS FOR MONITORING THE INTERIOR SPACE OF A MOTOR VEHICLE

BACKGROUND AND SUMMARY OF THE INVENTION

This application claims the priority of German Patent Document DE 100 62 977.6, filed Dec. 16, 2000, the disclosure of which is expressly incorporated by reference herein.

The invention relates to a method and apparatus for monitoring the interior space of a motor vehicle by means of infrared IR radiation.

The interior space of a motor vehicle is a highly dynamic space in terms of image processing technology. The effects of external light sources, such as the sun, are especially disruptive. The use of a Highly Dynamic Camera (HDR camera) is disadvantageous, in that such cameras are very slow and also very expensive. In depicting its data, the starting image of an HDR camera normally employs a depth of 16–20 bits (120 dB/1048 k gray scale values) per image point (pixel) in order to depict the full range of optical dynamics. This pixel depth is necessary for further processing of the image information, so that all relevant information can be derived from the initial scene. This translates into an increase in the amount of data per image relative to images from conventional monochromatic cameras, which generally depict the filmed scenery at 8 Bits per pixel (256 gray scale values/48 dB). This increased amount of data in turn results in a slower reading speed and increased consequential costs of the analyzing hardware. Both factors pose a considerable impediment to the use of HDR cameras in automotive applications.

The object of the invention is to create a method and apparatus of the type specified initially, with which it is possible to quickly and efficiently analyze a highly dynamic environment using an image processing procedure.

The invention meets the object with the following methods and apparatus.

In accordance with one aspect of the invention, a method for monitoring the interior space of a motor vehicle by means of IR radiation includes (1) placing at least one stationary IR transmitter and at least one stationary IR receiver for receiving reflected IR radiation in a central position in the vehicle interior space, (2) temporarily irradiating the vehicle interior space, (3) recording two images of the interior space at different illumination levels, and (4) subtracting the two images from one another with respect to their gray scale values for suppression of interfering effects.

In accordance with another aspect of the invention, an apparatus for monitoring an interior space of a motor vehicle by means of IR radiation includes an IR transmitter disposed in the vehicle interior space, an IR receiver for obtaining IR images of the interior space of the vehicle, and an analyzer for analyzing a signal received from the IR receiver. The IR transmitter is capable of emitting IR radiation at two different illumination levels to illuminate the interior space of the vehicle. The IR receiver is disposed in the vehicle interior space. The analyzer is designed to obtain an image of the interior space by subtracting gray scale values of one of the images from gray scale values of the other image, thereby suppressing interfering effects from external IR radiation sources. The two images are recorded at different illumination levels and at different instances of time.

In accordance with a further aspect of the invention, a method for monitoring an interior space of a motor vehicle by means of IR radiation includes (1) recording two images of the vehicle interior space at different illumination levels of IR radiation at different instances of time, and (2) obtaining an image of the interior space of the vehicle by subtracting gray scale values of one of the images from gray scale values of the other image, thereby suppressing interfering effects from external IR radiation sources on the image of the interior space. The IR radiation is emitted by an IR transmitter disposed in the interior space of the vehicle.

The capabilities of the camera are not expanded in this invention. Instead, the environment that is to be analyzed is influenced. This is achieved with innovative illumination methods, which are described in detail in the following.

Other objects, advantages and novel features of the present invention will become apparent from the following detailed description of the invention when considered in conjunction with the accompanying drawings.

DETAILED DESCRIPTION OF THE DRAWINGS

One means of eliminating these interfering effects and analyzing such a space by digital image processing is through the use of a camera that only detects wavelengths emitted by an internal, controllable light source (e.g., in the proximate IR range). The scenery's underlying illumination intensity E is kept constant over time. This means that, even when there are fluctuations in external interfering effects, a pixel of the image sensor only changes its gray scale value when the scenery being analyzed changes. Such noise or offset suppression significantly simplifies the ensuing image analysis and leads to reduced system costs with respect to the analysis hardware. To achieve such offset suppression, an image is first taken without internal illumination $E_{sun}$ and, as soon as possible thereafter, one is taken with internal illumination ($E_{sun}+E_{ir}$). This is explained in detail on the basis of FIG. 1.

If these two images $E_{sun}$ and $E_{sun}+E_{ir}$ are subtracted from one another, the difference in the individual pixels results in an image, which only depicts the received light output from the internal light source. The variable offset of the external light source(s) is eliminated. This means that the brightness in the output image of offset suppression does not change over time, even if, for example, the interior light in the interior space of the vehicle is switched on or off. Thus, the output sequence of offset suppression is free of light fluctuations.

The gray scale value detected by the camera is a function of the actual illumination intensity and the reflectivity factor p of the surface. Thus, the different reflective values of the objects in the scene form the actual image.

$$(E_{sun}+E_{ir})-E_{sun}=E_{ir}=const.\ gl=f(p \cdot E_{ir}) \tag{Eqtn. 1}$$

Figure 1:
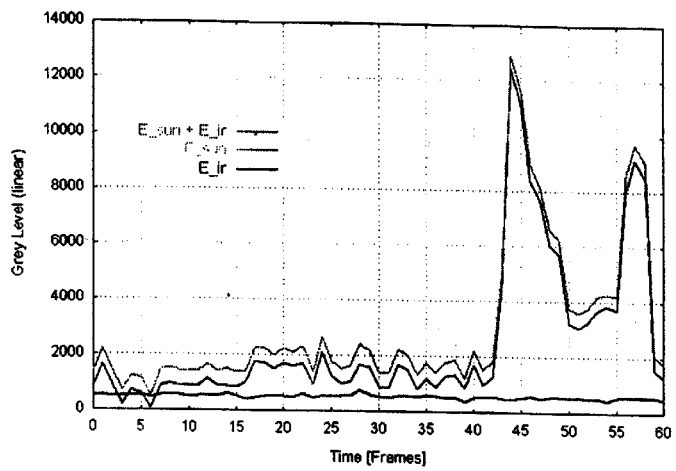
FIG. 1 is a chart showing the gray level of a receiver pixel with internal illumination, the gray level of the receiver pixel without internal illumination, and the difference between the two conditions.

This relationship is depicted in FIG. 1, in which the signal of an individual pixel (gray level) was plotted over time (time range). The difference between the reading of two images of the image sensor (frames) serves as the time unit. At an image rate of 25 Hz, this corresponds to one image every 40 ms. The position of the pixel on the image sensor remains constant. The sequence reveals minor fluctuations in illumination and a larger double peak, which is caused by a powerful external light source that was briefly directed into the vehicle interior.

This known method can be applied especially successfully if the following basic conditions are met: (1) The camera being used can record the entire optical dynamic range of the scene, and does not go into saturation (burn-out/burn-in), even with individual pixels or image areas; (2) The strength of external illumination $E_{sun}$ does not change between the two images (otherwise the outcome of the subtraction of the two input images would be unusable); (3) The entire scenery to be analyzed is subject to the interior illumination, as is the case in enclosed spaces, such as in a vehicle; and (4) The characteristic curve of the image sensor is preferably linear. This reduces the complexity of determining the difference between the two input images. The subtraction of two images of a camera with a logarithmic characteristic curve is the equivalent of a division of the gray scale values and is therefore unsuitable. However, it is possible to linearize the output signal of a logarithmic image sensor using a look-up table, so as to subsequently subtract the images.

The method described above is used solely for offset suppression of the input image. To this end, two partial images are subtracted from one another to obtain an output image without offset. The image at time $t_n$ is illuminated with an internal light source $E_{ir}$ in addition to the incident external light $E_{sun}$, while the image at time $t_{n+1}$ is not.

The use of an additional internal light source in image $t_n$ has the additional effect that the optical dynamic in the image is reduced relative to the image without additional illumination at time $t_{n+1}$. This is explained in the following:

A vehicle has an interior, in which an optical dynamic DR in the time zone and in the geographical zone is installed. The vehicle interior has changing external illumination effects and various interior materials.

The light fluctuations at a fixed position but between two photographs taken at time $t_n$ and $t_{n+1}$ are characterized by the actual illumination intensity E.

As no radiation from the external light source (sun, street illumination) hits the sensor surface directly when the image sensor, preferably provided as an IR camera, is positioned on the interior of the vehicle ceiling, the optical dynamic within an image (geographical zone) is essentially affected by the reflectivity p of the interior. This is elucidated by the following equation:

$$DR = 20 \log\left(\frac{p_{max} E_{max}}{p_{min} E_{min}}\right) \quad \text{(Eqtn. 2)}$$

$$0 < p < 1$$

In a scene without additional internal illumination, the incident irradiation intensities $E_{min}$ and $E_{max}$ from external light sources correspond essentially to solar radiation $E_{sun}$ in autonomous vehicles.

$$E_{max} = E_{sun,max}$$

$$E_{min} = E_{sun,min} \quad \text{(Eqtn. 3)}$$

When additional internal illumination $E_{ir}$ is used, e.g., in the proximate infrared, this acts in addition to $E_{sun}$.

$$E_{max} = E_{sun,max} + E_{ir}$$

$$E_{min} = E_{sun,min} + E_{ir} \quad \text{(Eqtn. 4)}$$

The optical dynamic of a scene is reduced by this offset, irrespective of the degree of reflection p of the surfaces:

$$DR_{sun} > DR_{sun+ir} \quad \text{(Eqtn. 5)}$$

$$20 \log\left(\frac{p_{max} E_{sun,max}}{p_{min} E_{sun,min}}\right) > 20 \log\left(\frac{p_{max}(E_{sun,max} + E_{ir})}{p_{min}(E_{sun,min} + E_{ir})}\right)$$

$$\frac{p_{max} E_{sun,max}}{p_{min} E_{sun,min}} > \frac{p_{max}(E_{sun,max} + E_{ir})}{p_{min}(E_{sun,min} + E_{ir})}$$

$$\frac{E_{sun,max}}{E_{sun,min}} > \frac{(E_{sun,max} + E_{ir})}{(E_{sun,min} + E_{ir})}$$

$$E_{sun,max}(E_{sun,min} + E_{ir}) > E_{sun,min}(E_{sun,max} + E_{ir})$$

$$E_{sun,max} E_{ir} > E_{sun,min} E_{ir}$$

$$E_{sun,max} > E_{sun,min}$$

qed.

Figure 2:
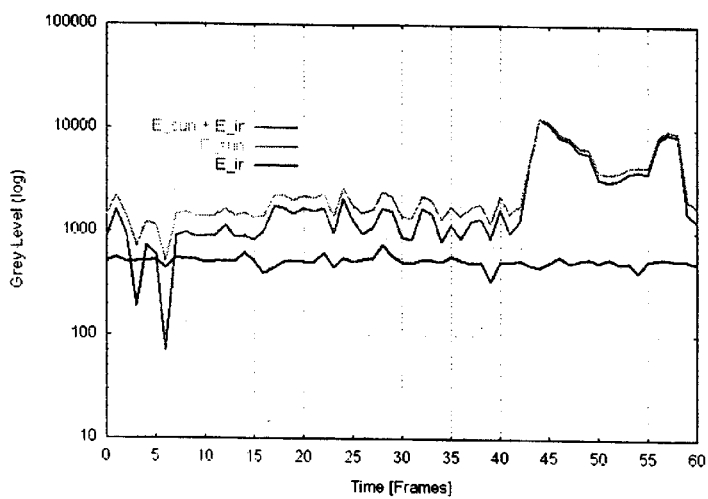
FIG. 2 is the same as the chart shown in FIG. 1 with a logarithmic scale.

This is illustrated in FIG. 2, which depicts the same plot as in FIG. 1, except that in this case the gray scale values were plotted logarithmically and not linearly, so as to emphasize the effects of the image sensor dynamics.

A real example of this is as follows: A scene has a dynamic of $E_{sun,min} = 4 \cdot 10^{-4}$ W/m² and $E_{sun,max} = 50$ W/m². This irradiation intensity is now converted into gray scale values of 1:125 k by a linear HDR camera. This corresponds to a dynamic of 102 dB or a contrast of 1:125 k. The dynamic in the image is reduced to 60 dB by an additional offset of $E_{ir} = 50$ mW/m², produced by targeted internal illumination. This corresponds to a contrast of 1:1000 and, therefore, to the output of commercially available CMOS sensors with a resolution of 10 Bits.

$$\frac{50 \text{ W/m}^2}{4.4 \cdot 10^{-4} \text{ W/m}^2} = 125 \text{ k} \quad \text{(Eqtn. 6)}$$

$$\frac{50 \text{ W/m}^2 + E_{ir}}{4.4 \cdot 10^{-4} \text{ W/m}^2 + E_{ir}} = 1 \text{ k}$$

$$E_{ir} \approx 50 \text{ mW/m}^2$$

Subtraction generally reduces the dynamic of the initial image of the offset suppression by the light output of the sun. However, to calculate the initial image of the offset suppression, it is necessary to continue to record a partial image without internal illumination, which, due to the irradiation from the sun, exhibits a consistently high dynamic. It is at this point that the method and apparatus according to the present invention are used. To be able to use a sensor that is not highly dynamic, in spite of a highly dynamic environment, the dynamic of both input images is reduced for the method and apparatus of offset suppression described.

The object of the invention is to reduce the optical dynamic of a space (such as an automobile interior), in spite of a highly dynamic environment, while at the same time suppressing interfering external light.

To achieve this object, two successive images in an image sequence at time $t_n$ and $t_{n+1}$ are used to generate an initial image. Both images will be illuminated by a controllable internal illumination source at two different light output levels: $E_{ir,hi}$ at time $t_n$, and $E_{ir,low}$ at time $t_{n+1}$.

Figure 3:
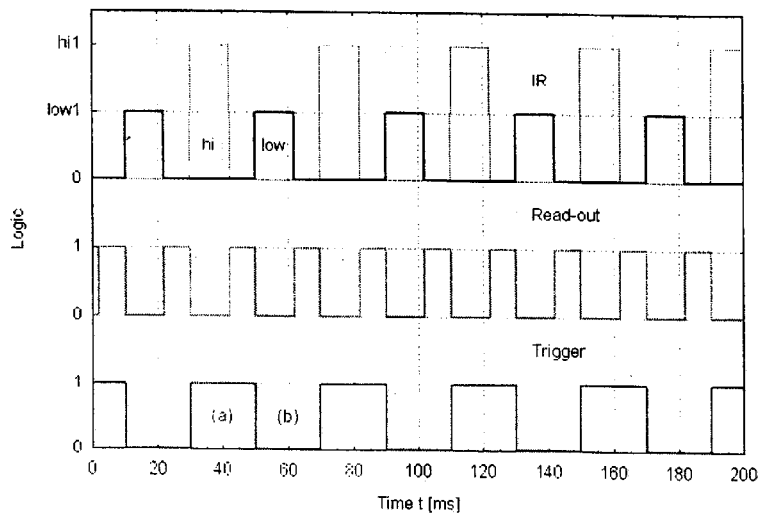
FIG. 3 shows a light-emitting diode controlled by a logic, which diode operates at two different current levels, so as to emit light output at two different levels.

This combines the advantages of offset suppression with those of dynamic reduction. This is illustrated in FIG. 3, in which a high-performance light-emitting diode is used that is controlled by a logic and, depending on the image, is operated at different current levels, so that two different light outputs are emitted.

It is sufficient to trigger the light-emitting diode during the image sensor's integration phase, as the pixels will, in fact, only detect light at that time. To save energy and allow the light source to cool off, the internal illumination can be switched off during the sensor's read-out phase. This allows for larger pulse currents and, consequently, a higher light output coincident with smaller light-emitting diodes.

$E_{ir,low}$ acts as an amplification of the minimal light output $E_{min}$, which was previously defined only by the external light sources with $E_{sun,min}$. Consequently, the initial image of double illumination is formed as follows:

$$|(E_{sun}+E_{ir,hi})-(E_{sun}+E_{ir,low})|=|E_{ir,hi}-E_{ir,low}|=const. \quad \text{(Eqtn. 7)}$$

The same basic conditions apply in this situation as apply in connection with the reduction in the dynamic.

The intensities of $E_{ir}$ can be calculated as follows: In both images, the original dynamic of the scene is reduced by $E_{ir}$. The relationship between the intensities $E_{ir,hi}$ and $E_{ir,low}$ are shown in Equation 8, in which $E_{ir,hi}$ causes a greater reduction in dynamic than $E_{ir,low}$, thus producing less contrast.

$$20 \log\left(\left|\frac{E_{sun,max} + E_{ir,hi}}{E_{sun,min} + E_{ir,hi}} - \frac{E_{sun,max} + E_{ir,low}}{E_{sun,min} + E_{ir,low}}\right|\right) = DR_{df} \quad \text{(Eqtn. 8)}$$

As a result, the dynamic $DR_{df}$ of the initial image is formed by the difference between the two internal illumination sources $E_{ir,hi}$ and $E_{ir,low}$, as the external light component is eliminated by the offset suppression in accordance with Equation 7.

Using the arithmetic example from Equation 6, this output image of the double illumination should feature a maximum contrast $DR_{df}$ of 1:255, which corresponds to a dynamic of 48 dB or a linear pixel depth of 8 Bits. The maximum camera dynamic of commercially available CMOS cameras was already specified as 60 dB, thus leading to the need for an internal illumination of 50 mW/M². This minimum internal illumination needed for dynamic reduction of the scene is advantageously defined as $E_{ir,low}$. A stronger internal illumination $E_{ir,hi}$ only results in stronger dynamic reduction of the scene and is therefore definitely within the recording range of the camera.

$$20 \log\left(\left|\frac{50 \text{ W/m}^2 + E_{ir,hi}}{4.4\cdot 10^{-4} + E_{ir,hi}} - \frac{50 \text{ W/m}^2 + E_{ir,low}}{4.4\cdot 10^{-4} + E_{ir,hi}}\right|\right) = 48 \text{ dB} \quad \text{(Eqtn. 9)}$$

$$E_{ir,low} = 50 \text{ mW/m}^2$$

$$\Rightarrow E_{ir,hi} \approx 68 \text{ mW/m}^2$$

The irradiation intensities occurring in a scene, $E_{sun,min}$ and $E_{sun,max}$, are established by environmental factors and are therefore uncontrollable.

In the invention, the optical dynamic of a scene is influenced by variation of $E_{ir,low}$ and $E_{ir,hi}$ to such an extent that even scenes with a rather high dynamic $DR_{sun}$ can be analyzed with cameras with a lower optical dynamic $DR_{df}$ without losing image information, along with simultaneous offset suppression.

The advantages resulting from double illumination in comparison with conventional, continuous illumination in the proximate IR range are discussed below.

The speed of a CMOS camera, when used in an automotive application without basic constraints, such as video standards, is decisively determined by the integration time of the output current from the photoelectric diodes. A camera that requires a 10 ms exposure in order to apply a stable output signal to the pixels cannot deliver images any faster than these 10 ms. There is also a time delay for reading the pixels. The stronger the incident light around the sensor, the shorter the possible integration, as the distance to the dark current and background noise increases. Thus, increasing the minimum light output in the vehicle from $E_{sun,min}$ to $E_{sun,min}+E_{ir,low}$ allows the camera to be operated with a shorter exposure time right from the start, thereby increasing the image rate. OOP (Out-Of-Position) applications, in particular, involve very critical time requirements, which are essentially unachievable with an HDR camera at this time. By reducing the optical dynamic in the interior space of a vehicle, OOP detection through the use of image processing can be achieved cost-effectively, even with the effects of strong external light sources.

To accelerate the calculation of the offset-free and low dynamic initial image, the image pre-processing described above could already take place in the image sensor. This increases the speed of the overall system.

Internal illumination in the proximate IR range is necessary to ensure that the interior space of a vehicle can also be analyzed without external illumination (sun, etc.). This light source is not operated at one, but at two different light output levels, which results in slight increase in cost, due to the trigger logic. The costs of a CMOS image sensor that is already commercially available are lower than those of a sensor with a high dynamic specifically designed for automotive applications.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed:

1. A method for monitoring the interior space of a motor vehicle by means of IR radiation, comprising the acts of:
    placing at least one stationary IR transmitter and at least one stationary IR receiver for receiving reflected IR radiation in the vehicle interior space;
    using the at least one stationary IR transmitter to temporarily irradiate the vehicle interior space with IR illumination at two different levels;
    recording first and second images with the different levels of IR illumination; and
    subtracting the first and second images from one another with respect to their gray scale values for suppression of interfering effects.

2. The method according claim 1, further comprising the act of: using an optical sensor element of the at least one stationary IR receiver having a linear characteristic.

3. The method according to claim 1, further comprising the act of: determining the brightness of an output image using the at least one stationary IR transmitter, with external light sources having no effect on the output image.

4. The method according to claim 1, further comprising the act of: using the at least one stationary IR receiver having a reduced optical dynamic relative to an dynamic that would be necessary to record an depicted scene without loss of image information using conventional pulse or constant illumination.

5. The method according claim 1, further comprising the act of: using an optical sensor element of the at least one stationary IR receiver having a non-linear characteristic curve but having a linear output by means of compensation using a look-up table.

6. An apparatus for monitoring an interior space of a motor vehicle by means of IR radiation, the apparatus comprising:

at least one IR transmitter disposed in the vehicle interior space and capable of emitting IR radiation at two different illumination levels to illuminate the interior space of the vehicle;

at least one IR receiver for obtaining IR images of the interior space of the vehicle, the IR receiver being disposed in the vehicle interior space; and an analyzer for analyzing a signal received from the at least one IR receiver, the analyzer being designed to obtain an image of the interior space by subtracting gray scale values of one of the images from gray scale values of the other image, thereby suppressing interfering effects from external IR radiation sources, wherein the two images are recorded at different IR illumination levels and at different instances of time.

7. The apparatus according to claim 6, wherein the at least one IR receiver has a linear characteristic curve.

8. The apparatus according to claim 6, wherein an optical sensor element of the at least one stationary IR receiver has a non-linear characteristic curve but has a linear output by means of compensation using a look-up table.

9. A method for monitoring an interior space of a motor vehicle by means of IR radiation, comprising the acts of:

recording two images of the vehicle interior space at different illumination levels of IR radiation at different instances of time, the IR radiation being emitted at least partially by at least one IR transmitter disposed in the interior space of the vehicle;

obtaining an image of the interior space of the vehicle by subtracting gray scale values of one of the images from gray scale values of the other image, thereby suppressing interfering effects from external IR radiation sources on the image of the interior space.

10. The method according to claim 9, wherein the at least one IR receiver has a linear characteristic curve.

11. The method according to claim 9, wherein the at least one IR receiver has a non-linear characteristic curve but has a linear output by means of compensation using a look-up table.

* * * * *